(12) United States Patent
Tsai et al.

(10) Patent No.: US 8,369,102 B2
(45) Date of Patent: Feb. 5, 2013

(54) COMPUTER SYSTEM WITH RISER CARD

(75) Inventors: Lung-Sheng Tsai, Taipei Hsien (TW);
Chia-Kang Wu, Taipei Hsien (TW);
Li-Ping Chen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 225 days.

(21) Appl. No.: 12/950,112

(22) Filed: Nov. 19, 2010

(65) Prior Publication Data

US 2011/0273853 A1    Nov. 10, 2011

(30) Foreign Application Priority Data

May 4, 2010    (CN) .......................... 2010 1 0162016

(51) Int. Cl.
*H05K 7/02* (2006.01)
*H05K 7/04* (2006.01)

(52) U.S. Cl. .................. 361/807; 361/810; 361/809

(58) Field of Classification Search .................. 361/807, 361/809, 810
See application file for complete search history.

(56) References Cited

U.S. PATENT DOCUMENTS

| | | | | |
|---|---|---|---|---|
| 4,979,075 | A * | 12/1990 | Murphy | 361/679.32 |
| 6,504,725 | B1 * | 1/2003 | Lam | 361/785 |
| 6,680,002 | B2 * | 1/2004 | Yamauchi et al. | 252/299.01 |
| 6,749,439 | B1 * | 6/2004 | Potter et al. | 439/65 |
| 7,075,797 | B1 * | 7/2006 | Leonard et al. | 361/803 |
| 7,499,285 | B2 * | 3/2009 | Chen et al. | 361/752 |
| 7,645,144 | B2 * | 1/2010 | Tzeng et al. | 439/65 |
| 7,980,897 | B2 * | 7/2011 | Fukatsu et al. | 439/625 |
| 8,295,060 | B2 * | 10/2012 | Liu et al. | 361/800 |
| 2008/0106862 | A1 * | 5/2008 | Liang | 361/686 |

* cited by examiner

*Primary Examiner* — Hung S Bui
(74) *Attorney, Agent, or Firm* — Altis Law Group, Inc.

(57) ABSTRACT

A computer system includes a riser card. The riser card includes a board body and a first socket. The board body includes a first surface. The first socket is located on the first surface. A first socket height of the first socket relative to the first surface is in the range of about 15 mm to about 16 mm.

1 Claim, 10 Drawing Sheets

COMPUTER SYSTEM WITH RISER CARD

BACKGROUND

1. Technical Field

The present disclosure relates to a computer system with a riser card.

2. Description of Related Art

In a computer system, the riser card is provided to electronically connect with expansion cards. Usually, a number of connectors are located on opposite surfaces of the riser card. However, interference usually happens between two expansion cards when the two expansion cards are located substantially close to each other and are secured to the chassis of the computer system. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 6:
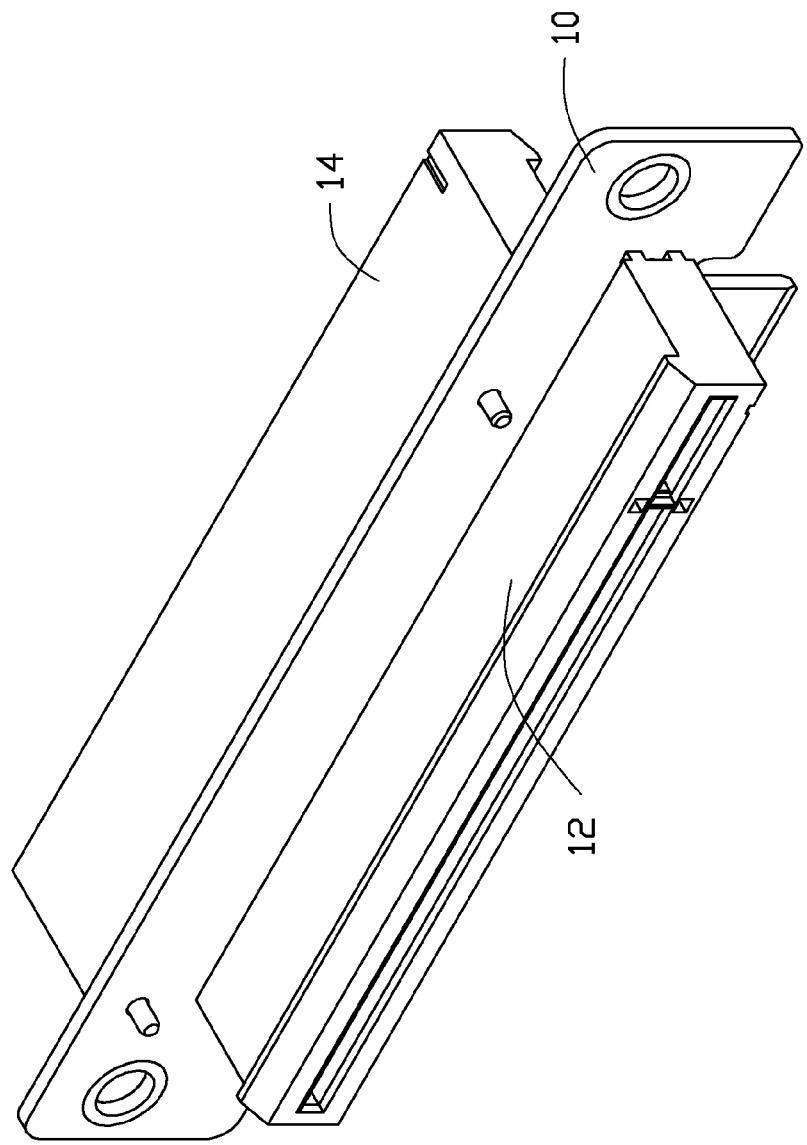
FIG. 6 is an isometric view of a riser card of a prior art.
Figure 7:
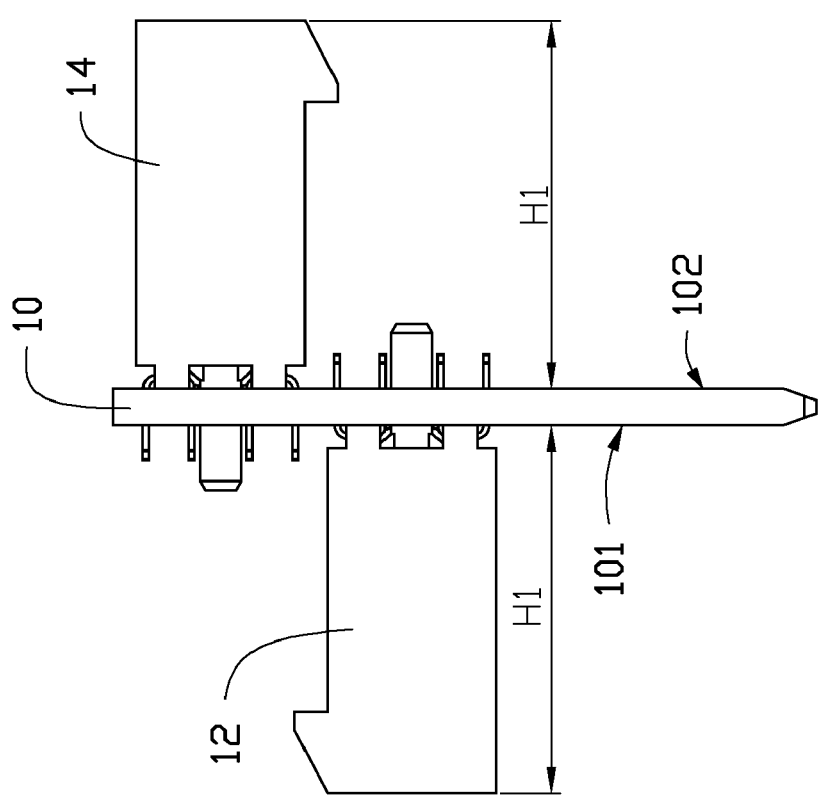
FIG. 7 is a side view of the riser card of prior art of FIG. 6.

Referring to FIGS. 6-7, a conventional riser card includes a board 10. The board 10 includes a first surface 101 and a second surface 102. The first surface 101 is substantially parallel to the second surface 102. A first connector 12 is located on the first surface 101, and a second connector 14 is located on the second surface 102. The first connector 12 has a first height H1 relative to the first surface 101, and the second connector 14 has a second height H2. The first height H1 is the same as the second height H2, which is, for example, substantially equal to 11 mm.

Figure 8:
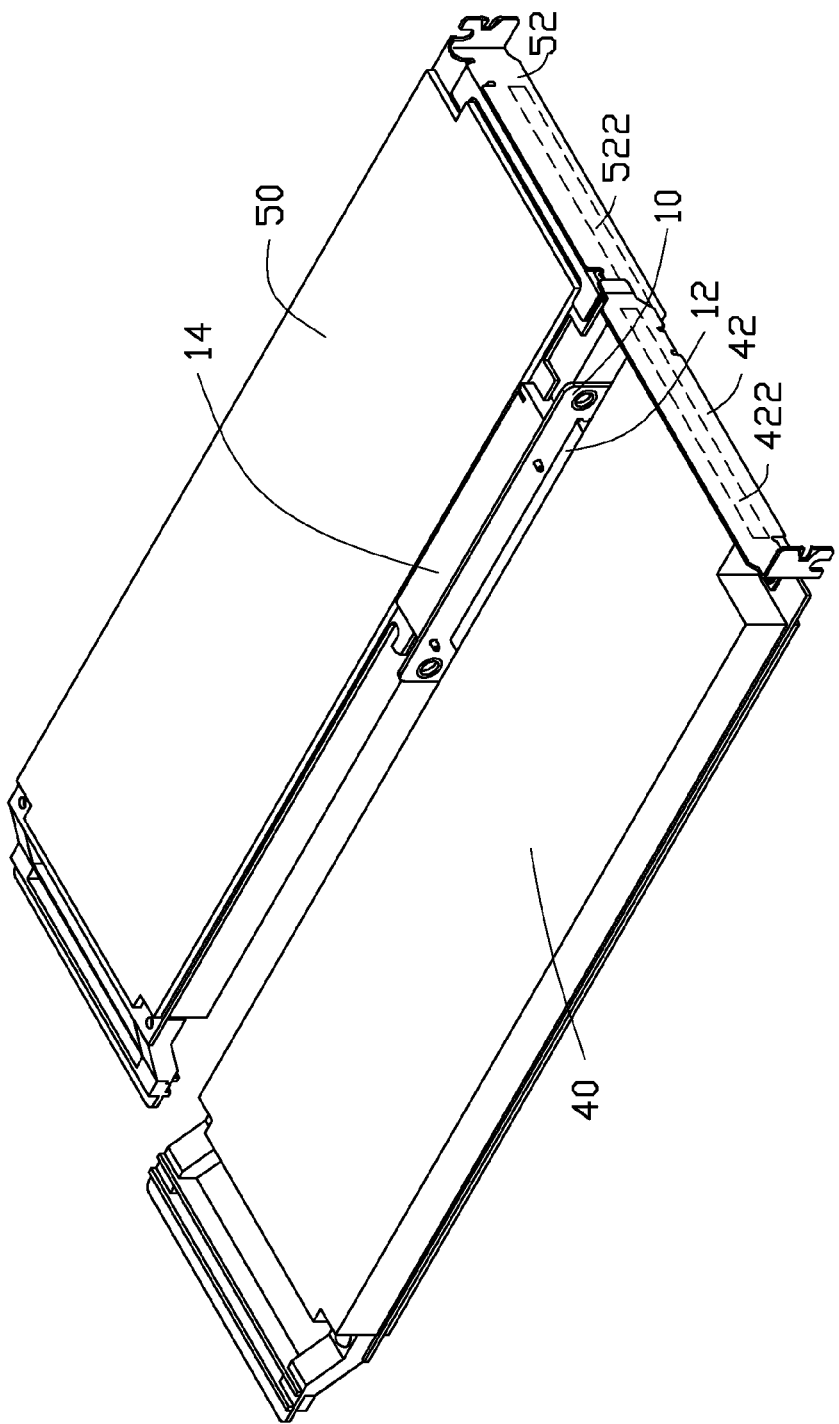
FIG. 8 is an assembled view of the riser card of prior art of FIG. 6 and the first expansion card and the second expansion card.

Referring to FIG. 8, the conventional riser card is used to electronically connect with a first expansion card 40 and a second expansion card 50. The first expansion card 40 includes a first securing plate 42, and the second expansion card 50 includes a second securing plate 52. Usually, the sizes of the first and second securing plate 42, 52 are well-known and standardized. A first opening 422 is defined in the first securing plate 42, and a second opening 522 is defined in the second securing plate 52. The first opening 422 is configured for ports (not shown) of the first expansion card 40 to pass through, and the second opening 522 is configured for ports (not shown) of the second expansion card 50 to pass through.

In use, the first expansion card 40 is inserted in the first connector 12, and the second expansion card 50 is inserted in the second connector 14. The first and second securing plates 42, 52 are secured to a computer chassis (not shown), and the riser card is secured to a circuit board (not shown), such as a motherboard. The circuit board is secured to the computer chassis.

Figure 9:
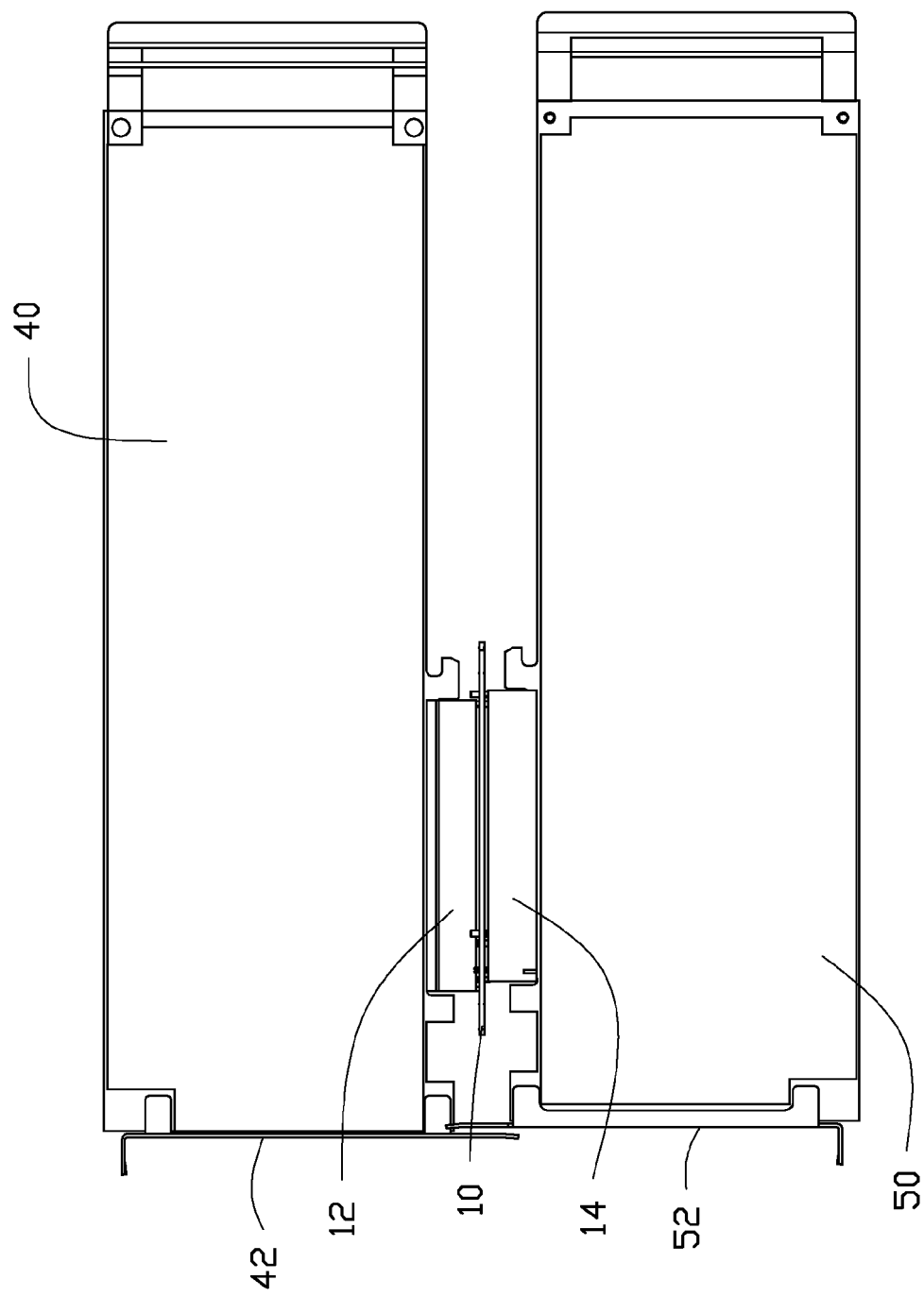
FIG. 9 is a top view of FIG. 8.
Figure 10:
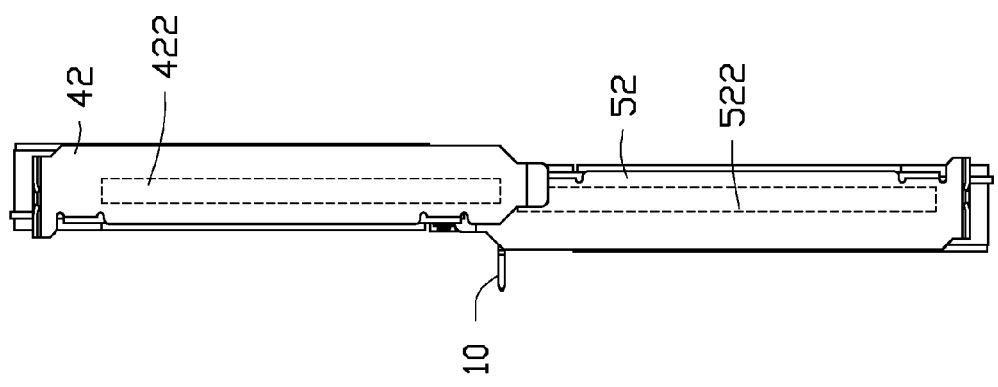
FIG. 10 is a side view of FIG. 8.

Referring to FIGS. 8-10, the first connector 12 close enough to the second connector 14, that the first opening 422 of the first securing plate 42 is covered or interfered with by the second securing plate 52, and the second opening 522 of the second securing plate 52 is covered or interfered with by the first securing plate 42. Therefore, it is very inconvenient to install the first and second expansion cards 40 and 50 to the computer chassis.

Figure 1:
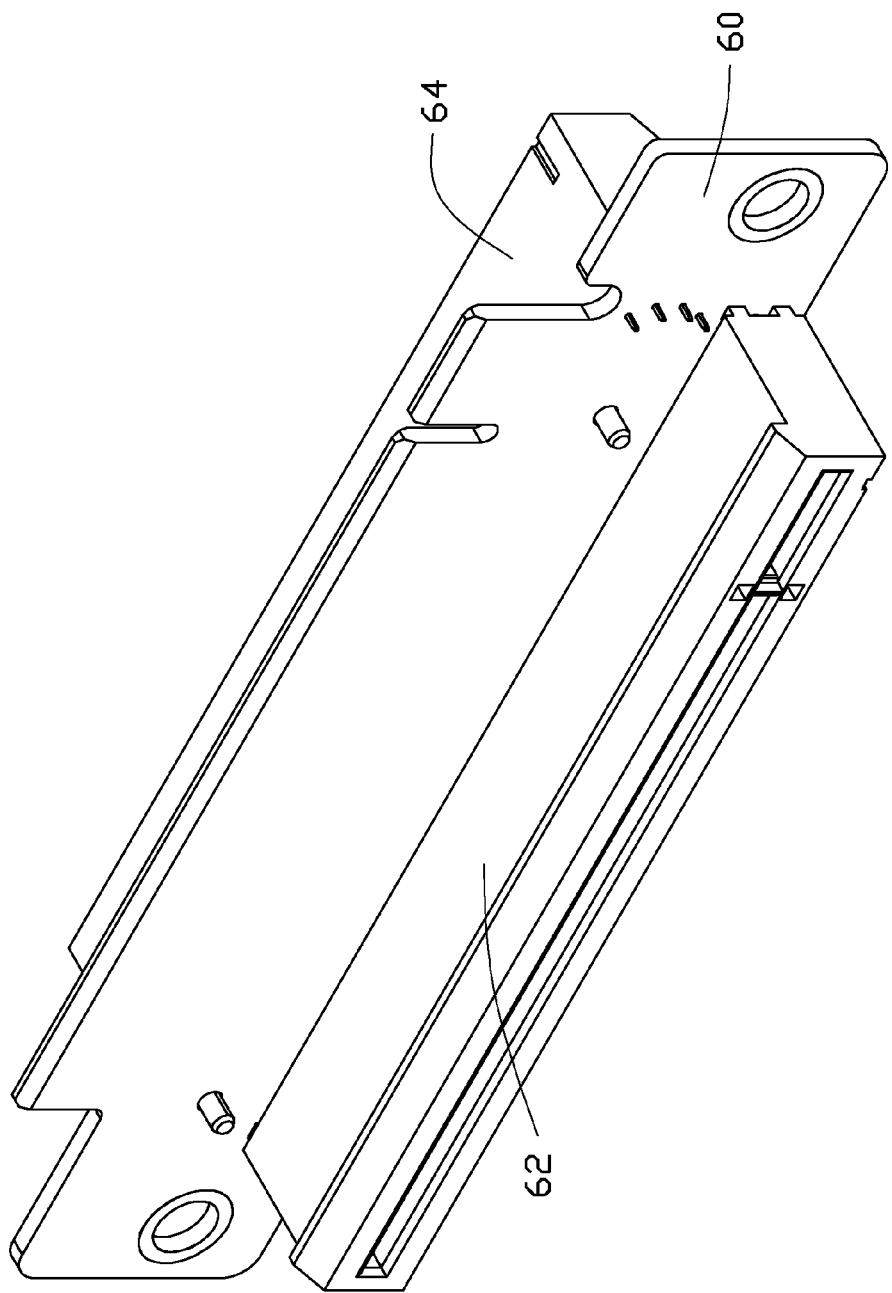
FIG. 1 is an isometric view of a riser card in accordance with an embodiment.
Figure 2:
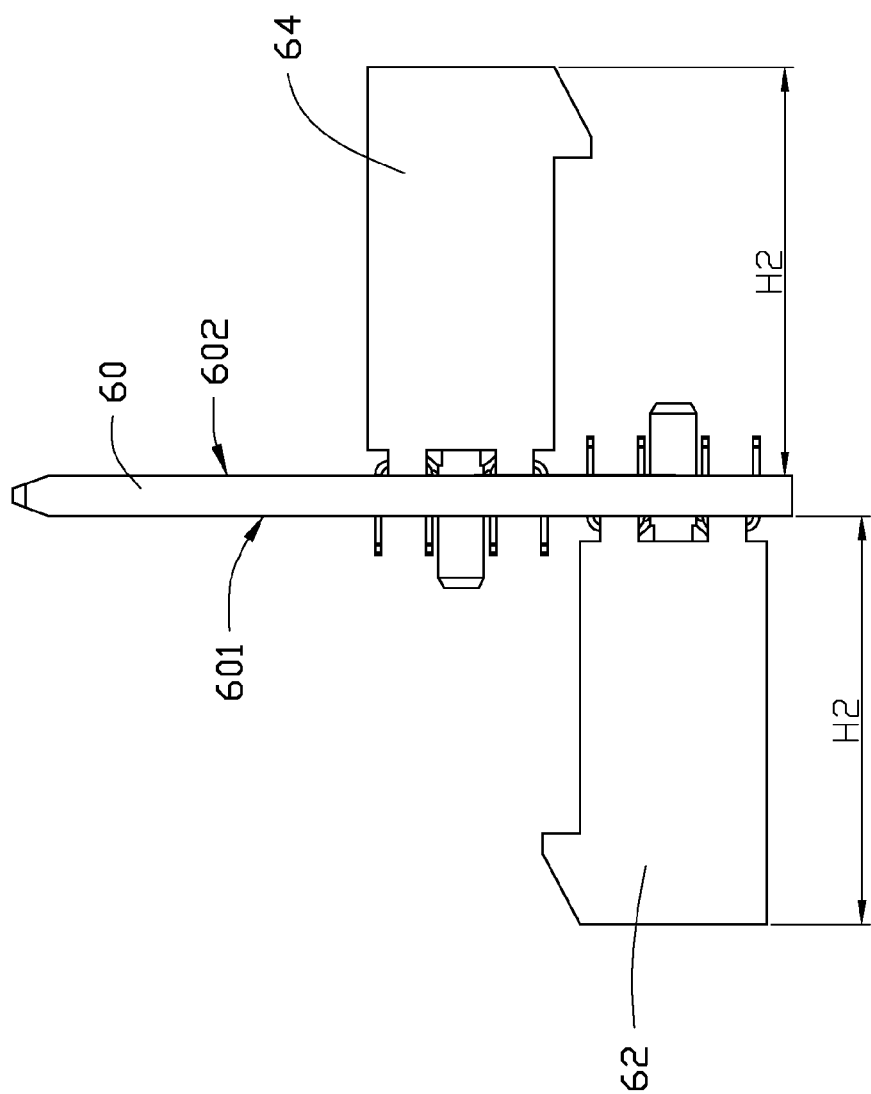
FIG. 2 is a side view of the riser card of FIG. 1.

An improved riser card is provided. Referring to FIGS. 1-2, a riser card in accordance with an embodiment, includes a board body 60. The board body 60 includes a first surface 601 and a second surface 602. The first surface 601 is opposite to and substantially parallel to the second surface 602. A first socket 62 is located on the first surface 601, and a second socket 64 is located on the second surface 602. The first socket 62 has a first socket height H1 relative to the first surface 601, and the second socket 64 has a second socket height H2. The first socket height H1 is the same as the second socket height H2, which is greater than 15 mm, but less than 16 mm.

Figure 3:
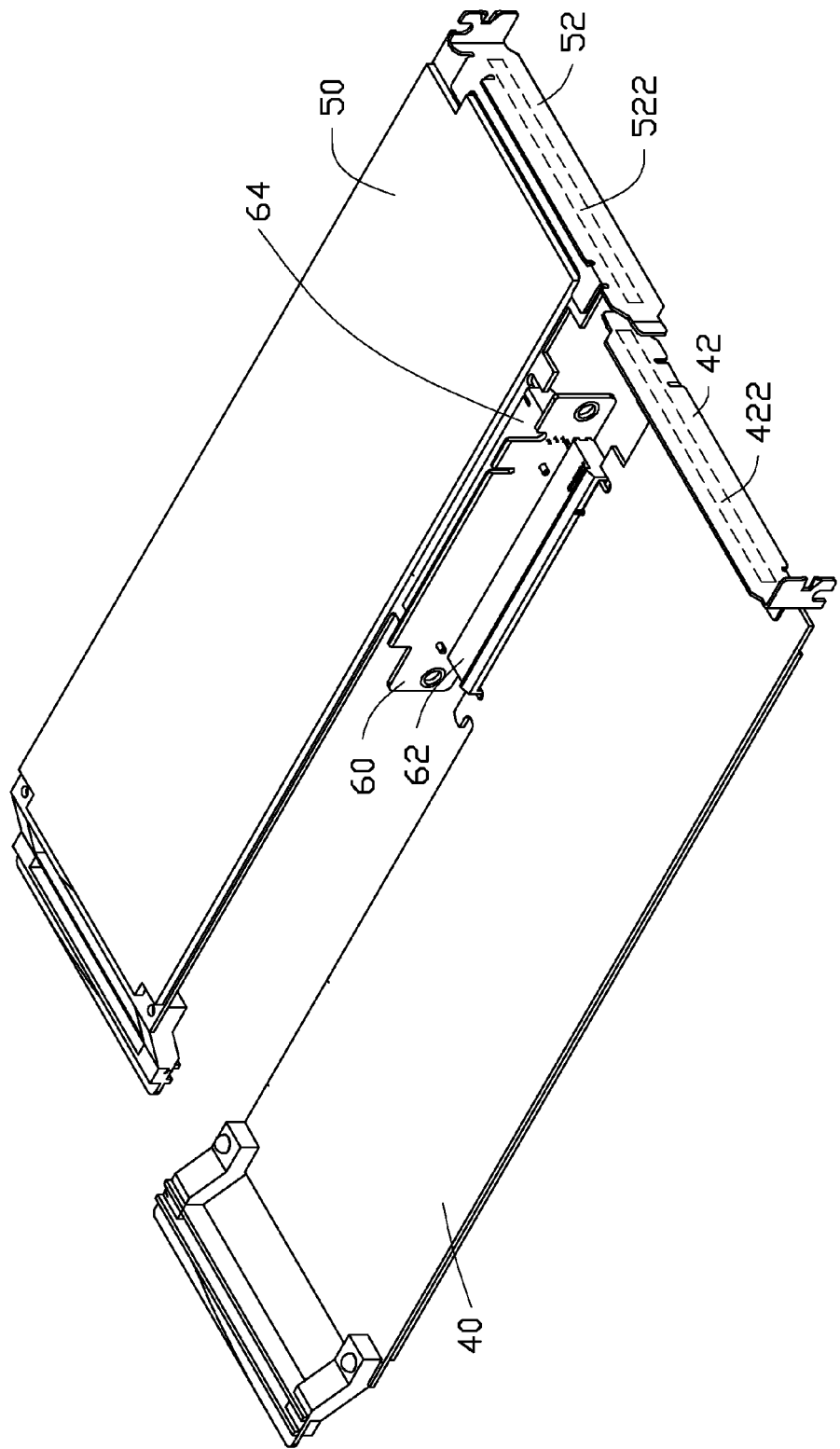
FIG. 3 is an assembled view of the riser card of FIG. 1 and a first expansion card and a second expansion card.

Referring to FIG. 3, in use, the improved riser card is used to electronically connect with the first expansion card 40 and the second expansion card 50. The first expansion card 40 is inserted in the first socket 62, and the second expansion card 50 is inserted in the second socket 64. The first and second securing plates 42, 52 are secured to a computer chassis of a computer system (not shown), and the riser card is secured to a circuit board (not shown), such as a motherboard, which is secured to the computer chassis.

Figure 4:
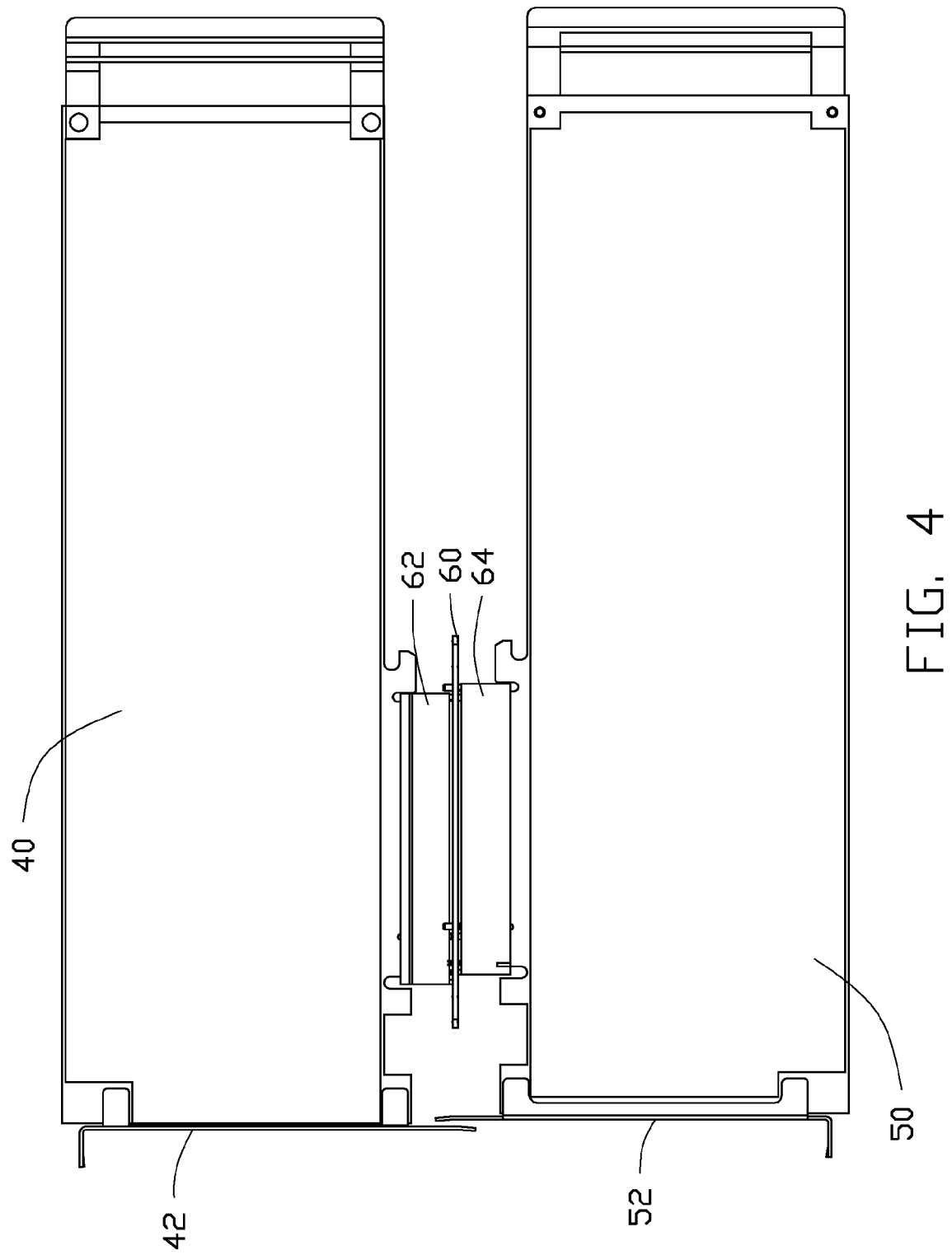
FIG. 4 is a top view of FIG. 3.
Figure 5:
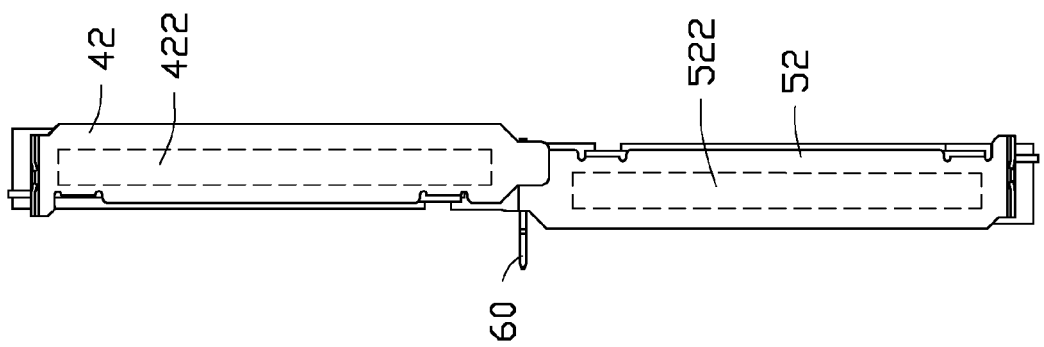
FIG. 5 is a side view of FIG. 3.

Referring to FIGS. 4-5, since the first and second socket heights H3 and H4 are in the range of about 15 mm to about 16 mm, which is greater than the first and second heights H1 and H2 of the first and second connectors 12 and 14 of a conventional riser card 4-5 mm, the first opening 422 of the first securing plate 42 cannot be covered by or interfered with the second securing plate 52. The second opening 522 of the second securing plate 52 also cannot be covered or interfered with by the first securing plate 42.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A riser card comprising:
 a board body comprising a first surface and a second surface; and
 a first socket located on the first surface;
 a second socket located on the second surface;
 a first expansion card connected to the first socket, the first expansion card comprising a first securing plate, the first securing plate defining a first opening configured for ports of the first expansion card to pass through;

a second expansion card connected to the second socket, the second expansion card comprising a second securing plate, the second securing plate defining a second opening configured for ports of the second expansion card to pass through;

wherein a first socket height of the first socket relative to the first surface and a second socket height of the second socket relative to the first surface are both in the range of about 15 mm to about 16 mm, the first securing plate is spaced from the second securing plate, the first opening is not covered by or interfered with the second securing plate, and the second opening is not covered by or interfered with the first securing plate.

\* \* \* \* \*